United States Patent
Woo et al.

(10) Patent No.: US 8,983,184 B2
(45) Date of Patent: Mar. 17, 2015

(54) VISION IMAGE INFORMATION STORAGE SYSTEM AND METHOD THEREOF, AND RECORDING MEDIUM HAVING RECORDED PROGRAM FOR IMPLEMENTING METHOD

(75) Inventors: Woon Tack Woo, Gwangju (KR); Se Jin Oh, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 584 days.

(21) Appl. No.: 13/378,196

(22) PCT Filed: Nov. 17, 2010

(86) PCT No.: PCT/KR2010/008123
§ 371 (c)(1),
(2), (4) Date: Dec. 14, 2011

(87) PCT Pub. No.: WO2011/093581
PCT Pub. Date: Aug. 4, 2011

(65) Prior Publication Data
US 2012/0087580 A1    Apr. 12, 2012

(30) Foreign Application Priority Data
Jan. 26, 2010    (KR) .................... 10-2010-0007126

(51) Int. Cl.
*G06K 9/00*    (2006.01)
*G06T 19/00*    (2011.01)
*G06T 15/20*    (2011.01)
*H04N 13/00*    (2006.01)
*H04N 13/02*    (2006.01)

(52) U.S. Cl.
CPC ............... *G06T 19/006* (2013.01); *G06T 15/20* (2013.01); *H04N 13/0011* (2013.01); *H04N 13/0278* (2013.01); *G06K 9/00671* (2013.01)
USPC ........................................................ 382/165

(58) Field of Classification Search
USPC ................... 382/165, 171, 190, 203
See application file for complete search history.

(56) References Cited

U.S. PATENT DOCUMENTS 8,463,073 B2 *  6/2013  Ma et al. ...................... 382/289

* cited by examiner

*Primary Examiner* — Duy M Dang
(74) *Attorney, Agent, or Firm* — Rothwell, Figg, Ernst & Manbeck, P.C.

(57) ABSTRACT

The present invention relates to a system for generating a vision image from the viewpoint of an agent in an augmented reality environment, a method thereof, and a recording medium in which a program for implementing the method is recorded. The invention provides a vision image information storage system comprising: a vision image generator which extracts visual objects from an augmented reality environment based on a predetermined agent, and generates a vision image from the viewpoint of the agent; and an information storage unit which evaluates the objects included in the generated vision image based on a predetermined purpose, and stores information on the evaluated objects.

17 Claims, 4 Drawing Sheets

VISION IMAGE INFORMATION STORAGE SYSTEM AND METHOD THEREOF, AND RECORDING MEDIUM HAVING RECORDED PROGRAM FOR IMPLEMENTING METHOD

This is a National Phase Application filed under 35 U.S.C. §371 as a national stage of International Application No. PCT/KR2010/008123, filed Nov. 17, 2010, claiming the benefit from Korean Patent Application No. 10-2010-0007126, filed Jan. 26, 2010, the entire content of each of which is hereby incorporated by reference in its entirety.

TECHNICAL FIELD

The present invention relates to a system and method for storing vision image information and a recording medium storing a program for implementing the method. More specifically, the present invention relates to a system and method for generating a vision image from the viewpoint of an agent included in an augmented reality environment and storing information about objects included in the image, and a recording medium storing a program for implementing the method.

BACKGROUND ART

An agent is required to simulate the movement and behavior of a user in a Virtual Environment (VE) such as a virtual training system or a computer game. Such an agent can not only simply project virtual space from the viewpoint of a user, but also provides realism which provides the user with the impression of actually existing in the virtual space. Accordingly, there have been proposals in which virtual sensors are provided such that an agent can experience senses of vision, audition and touch.

In the conventional system, however, interaction between the agent and various physical objects was taken into consideration, and a method in which the agent autonomously recognizes objects is not taken into consideration. Therefore, the conventional system has difficulty implementing visible objects from the viewpoint of the agent and requires a long time to display visible objects on a screen. There was proposed a scheme which previously defined objects which were recognized by an agent, in which case there is the inconvenience of the definitions having to be frequently changed when objects are added or deleted.

DISCLOSURE

Technical Problem

The present invention has been made keeping in mind the above problems occurring in the prior art, and an object of the present invention is to provide a system and method for storing vision image information, which enable an agent to autonomously recognize objects, thereby creating a vision image from the viewpoint of the agent and storing information about the objects included in the image, and a recording medium storing a program for implementing the method.

Technical Solution

The present invention has been made to accomplish the above objects, and provides a system for storing vision image information, including a vision image generation unit for extracting visible objects from an Augmented Reality (AR) environment based on a predetermined agent and then generating a vision image from a viewpoint of the agent; and an information storage unit for storing information about objects evaluated based on a predetermined purpose and included in the generated vision image.

Additionally, the present invention provides a method of storing vision image information, including the steps of (a) extracting a visible objects from an AR environment based on a predetermined agent and then generating a vision image from a viewpoint of the agent; and (b) storing information about objects evaluated based on a predetermined purpose and included in the generated vision image.

Advantageous Effects

The present invention can achieve the following advantages. First, since an agent autonomously recognizes objects, the inconvenience of changing information stored in a system can be eliminated even when objects are added to or deleted from a virtual environment. Second, since visible attention objects are selected from the viewpoint of an agent, the processing speed of a system can be improved and a user's sense of immersion can be increased.

BEST MODE

Figure 1:
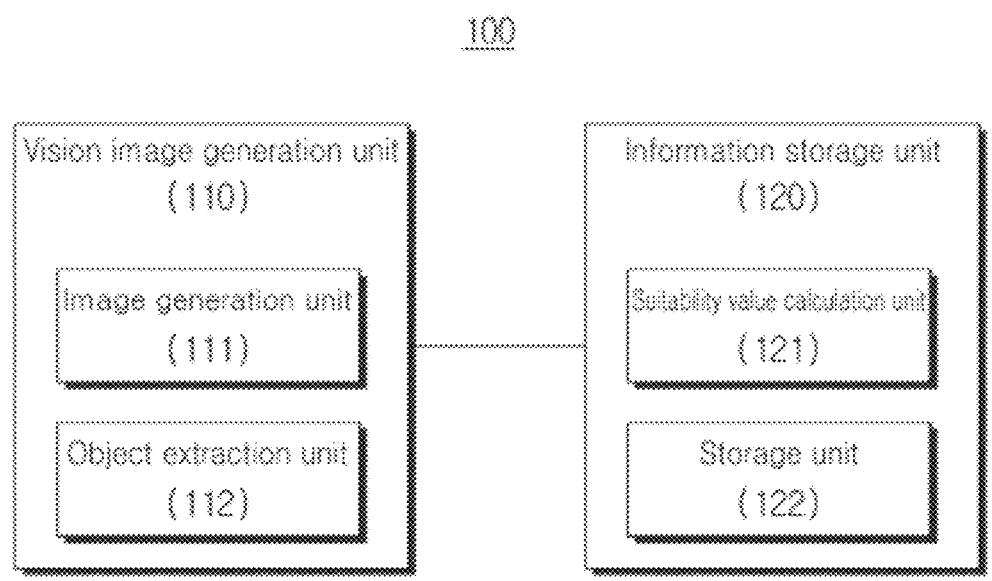
FIG. 1 is a block diagram schematically showing a system for storing vision image information from the viewpoint of an agent according to a preferred embodiment of the present invention.

The present invention has been made to accomplish the above objects, and provides a system for storing vision image information, including a vision image generation unit for extracting visible objects from an Augmented Reality (AR) environment based on a predetermined agent and then generating a vision image from a viewpoint of the agent; and an information storage unit for storing information about objects evaluated based on a predetermined purpose and included in the generated vision image.

Preferably, the temporary vision image generation unit includes an object extraction unit for extracting the visible objects from the viewpoint of the agent from an input image of the AR environment; and an image generation unit for arranging the extracted visible objects based on the agent and then generating the vision image.

Preferably, the object extraction unit extracts the visible objects by comparing feature points between the input image and a previously stored image. Alternatively, the object extraction unit includes a feature point extraction unit for extracting the feature points from the input image; an orientation estimation unit for estimating an orientation of the feature points from a patch image that incorporates the extracted feature points; a patch image rotation unit for rotating the patch image in the estimated orientation; a descriptor generation unit for generating first descriptors for the respective extracted feature points based on the rotation; a comparison unit for performing comparison in order to check whether there is one of the generated first descriptors which matches a second descriptor acquired from the previously stored image; a pose estimation unit for estimating a pose of a photographing apparatus using the first descriptor which matches the second descriptor; and a visible object extraction unit for extracting the visible objects by performing object recognition and the object tracking based on the estimated pose. Alternatively, the object extraction unit extracts the visible objects whenever there is a change in an image of an area in front of the agent or in a viewing area of a photographing apparatus for photographing the AR environment.

Preferably, the image generation unit includes a spatial relationship setup unit for setting up a spatial relationship between the visible objects using tracking information about objects, placed in the AR environment, when arranging the extracted visible objects; and an object arrangement unit for arranging the extracted visible objects while taking into consideration the set-up spatial relationship. Alternatively, the image generation unit performs rendering using a color value, randomly allocated to each of the visible objects by taking into consideration attributes, when generating the vision image. More preferably, the spatial relationship setup unit uses a translation value indicative of how far the object has moved from a photographing apparatus for photographing the AR environment, a rotation value indicative of by how much the object has rotated around a center coordinate system of the photographing apparatus, and a scale of a marker attached to the object when setting up the spatial relationship.

Preferably, each of the objects placed in the AR environment includes a marker used for recognition or tracking.

Preferably, the information storage unit includes a suitability value calculation unit for calculating a suitability value indicating a degree to which each of the objects included in the generated vision image is suitable for the purpose; and a storage unit for storing the information about the objects while taking into consideration the calculated suitability values.

Preferably, the suitability value calculation unit includes a comparison unit for comparing similarities between an object used by the agent as a target and the objects included in the generated vision image; and a suitability allocation unit for allocating a higher suitability to a higher similarity based on the comparison. Alternatively, the suitability value calculation unit controls the suitability value depending on whether the object used by the agent as the target is included in the generated vision image.

Additionally, the present invention provides a method of storing vision image information, including the steps of (a) extracting a visible objects from an AR environment based on a predetermined agent and then generating a vision image from a viewpoint of the agent; and (b) storing information about objects evaluated based on a predetermined purpose and included in the generated vision image.

Preferably, the step (a) includes the steps of (aa) extracting the visible objects from an input image of the AR environment from the viewpoint of the agent; and (ab) generating the vision image by arranging the extracted visible objects based on the agent.

Preferably, the step (b) includes the steps of (ba) calculating a suitability value indicating a degree to which each of the objects included in the generated vision image is suitable for the purpose; and (bb) storing information about the objects while taking into consideration the calculated suitability values. More preferably, the step (ba) includes the steps of (baa) comparing similarities between an object used by the agent as a target and the objects included in the generated vision image; and (bab) allocating a higher suitability to a higher similarity based on the comparison.

Mode for Invention

Preferred embodiments of the present invention will be described in detail below with reference to the accompanying drawings. It is to be noted that when reference numerals are assigned to elements in the drawings, the same reference numerals are used to designate the same elements even though the elements are shown in different drawings. Furthermore, in the description of the present invention, detailed descriptions of the known functions and constructions will be omitted if they are deemed to make the gist of the present invention unnecessarily vague. Furthermore, although the preferred embodiments of the present invention will be described below, the technical spirit of the present invention is not restricted or limited to the preferred embodiments and may be modified and implemented in various ways by those having ordinary skill in the art.

FIG. 1 is a block diagram schematically showing a system for storing vision image information from the viewpoint of an agent according to a preferred embodiment of the present invention. Referring to FIG. 1, the system 100 for storing vision image information from the viewpoint of an agent includes a vision image generation unit 110, including an object extraction unit 111 and an image generation unit 112, and an information storage unit 120 including a suitability value calculation unit 121 and a storage unit 122.

The present embodiment is directed towards vision-based context awareness which shows visible objects based on a reference object placed in an AR environment. In particular, the present embodiment is directed towards a technology in which a reference object autonomously recognizes and focuses attention on visible objects in accordance with a predetermined purpose. In the present embodiment, an object which is a reference for the performance of vision-based context awareness is an agent. The agent may be an augmented object which is augmented to an AR environment, and may be a physical object which is placed in an AR environment. The agent interacts with at least one object which is included in an AR environment.

The AR environment is a complex reality space which is formed in such a way that one or more objects in real space match one or more virtual objects. The AR environment is based on the real environment, and includes one or more physical objects and one or more virtual objects. Here, the physical objects refer to objects that actually exist in a real environment, and the virtual objects refer to virtual objects that are augmented to a real environment.

Physical objects included in the AR environment include markers by which a camera can recognize and track them. Here, all physical objects belonging to the viewing area of the camera are recognized and tracked at the same time based on an image which is captured by the camera. Furthermore, each physical object is mapped to the AR environment or establishes a correlation with other objects in the AR environment according to a predetermined criterion. In contrast, each augmented object is extracted from the database of a content server including information about virtual objects, and is augmented at a specific position in the AR environment. An augmented object is augmented at a specific position whenever there is a change in the position of a physical object so that the augmented object can form part of the AR environment along with the physical object.

Meanwhile, regarding a vision image based on the viewpoint of an agent, when a physical object and an augmented object that are placed in the viewing area of a camera are displayed, a physical object may be added or removed whenever there is a change in the position of an agent or of an object placed in the AR environment. Accordingly, in the present embodiment, it is preferred that a vision image from the viewpoint of an agent is updated simultaneously with a change in context.

Meanwhile, an object interacting with an agent may be a physical object or an augmented object which is included in the AR environment.

The vision image generation unit 110 functions to extract visible objects from an AR environment based on a predetermined agent and generate a vision image from the viewpoint of the agent. The vision image generation unit 110 includes the object extraction unit 111 and the image generation unit 112.

The vision image generation unit 110 estimates an image viewed by the agent in the AR environment, and provides it as a synthetic vision. More particularly, the vision image generation unit 110 extracts objects that are visible to the agent from an input image, augments at least one physical object, combined with a virtual object, while considering the viewing area or view point of a camera, and then generates an image of the AR environment (a scene description). Meanwhile, in order to implement synthetic vision, the vision image generation unit 110 may refer to "Navigation for Digital Actors based on Synthetic Vision, Memory and Learning" disclosed in Computer and Graphics, 19(1): 7-19 in 1995 by H. Noser, O. Renault, D. Thalmann, and N. M. Thalmann. In this case, the vision image generation unit 110 can efficiently estimate visible objects from the viewpoint of the agent.

The object extraction unit 111 functions to extract the visible objects from the viewpoint of the agent from the input image. Here, the input image may be defined as an image of the AR environment including at least one augmented virtual object. It is preferred that the object extraction unit 111 extract visible objects whenever an image of an area in front of the agent is changed according to a change in the viewpoint of the agent or whenever the viewing area of a photographing apparatus that photographs the AR environment is changed. Here, the visible objects are defined as objects which are viewed from the viewpoint of the agent.

The object extraction unit 111 includes an object recognition unit, an object tracking unit, and a tracking information generation unit. The object recognition unit recognizes at least one object, placed in an AR environment, from a generated image. Here, the object recognized by the object recognition unit is commonly a physical object, but may be an augmented virtual object. The object tracking unit tracks the recognized object objects placed in the AR environment include respective markers that enable recognition and tracking. The object recognition unit and the object tracking unit easily recognize and track the objects using the markers. The tracking information generation unit generates object tracking information as a result of the tracking.

The object extraction unit 111 uses a natural feature-based approach in order to extract visible objects. The natural feature-based approach enables the object recognition unit and the object tracking unit to recognize and track objects in real time. A method of extracting visible objects based on natural features will be described below.

First, a feature point extraction unit extracts feature points from an input image. The feature point extraction unit may use a fast corner detector when extracting the feature points. Thereafter, a patch image generation unit generates a patch image from the input image by incorporating the extracted feature points into the patch image. Thereafter, an orientation estimation unit estimates the orientation of the feature points based on the patch image. Thereafter, a patch image rotation unit rotates the patch image in the estimated orientation. Thereafter, a descriptor generation unit generates first descriptors for the respective feature points which are extracted from the rotated patch image.

Next, a comparison unit compares the first descriptors with second descriptors which are acquired from an image previously stored in a database. In order to compare the first descriptors with the second descriptors, the second descriptors corresponding to the first descriptors, respectively, have to be acquired. The acquisition of the second descriptors may be performed immediately before the comparison, or they may be performed some time before the comparison. The second descriptors, together with the first descriptors, may be acquired by the same descriptor generation unit, or may be acquired by a descriptor generation unit that is different from a descriptor generation unit which acquires the first descriptors. If there is any first descriptor which matches a second descriptor, a pose estimation unit estimates a camera pose using the matched descriptor. Thereafter, a visible object extraction unit extracts visible objects in real time by performing object recognition and object tracking based on the estimated camera pose. The visible object extraction unit may use an image-based feature tracking method in order to track the feature points of the image more rapidly and accurately.

A vision image, particularly a vision image from the viewpoint of an agent, is implemented in real time. Accordingly, the object extraction unit 111 should be able to implement visible object extraction functionality in real time. Furthermore, the object extraction unit 111 should also take into consideration a change in the viewpoint of the agent. The reason for this is that an image of an area in front of the agent may be changed depending on a change in the viewpoint of the agent and a visible object may be changed. Here, the change in the viewpoint of the agent refers to the case where the orientation of the viewing of the agent is changed.

The image generation unit 112 performs a function of generating a vision image by arranging visible objects extracted based on the agent. The image generation unit 112 generates an image of the AR environment by including at least one recognized and tracked physical object and at least one rendered virtual object in the vision image. Here, the position of an augmented virtual object is determined by taking into consideration a camera pose value acquired by the pose estimation unit.

The image generation unit 112 includes a spatial relationship setup unit and an object arrangement unit in order to arrange the extracted visible objects. The spatial relationship setup unit sets up a spatial relationship between objects visible to the agent by using tracking information about objects placed in the AR environment. The object arrangement unit arranges the visible objects from the viewpoint of the agent while taking into consideration the setup spatial relationship. The image generation unit 112 can easily search for the augmented positions of the virtual objects by arranging the visible objects using the spatial relationship setup unit and the object arrangement unit.

The spatial relationship setup unit may set up a spatial relationship between objects using a camera pose for each of the objects. This will be described below with reference to FIG. 2.

Figure 2A:
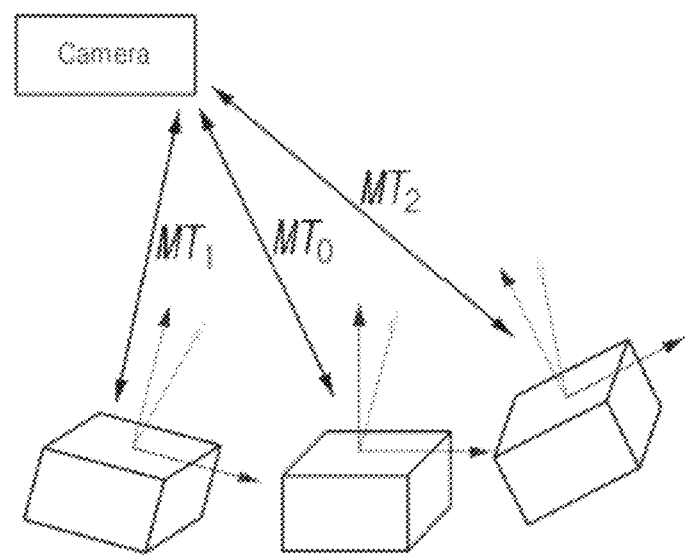
FIG. 2 is a diagram illustrating a process of extracting a relationship between physical objects.
Figure 2B:
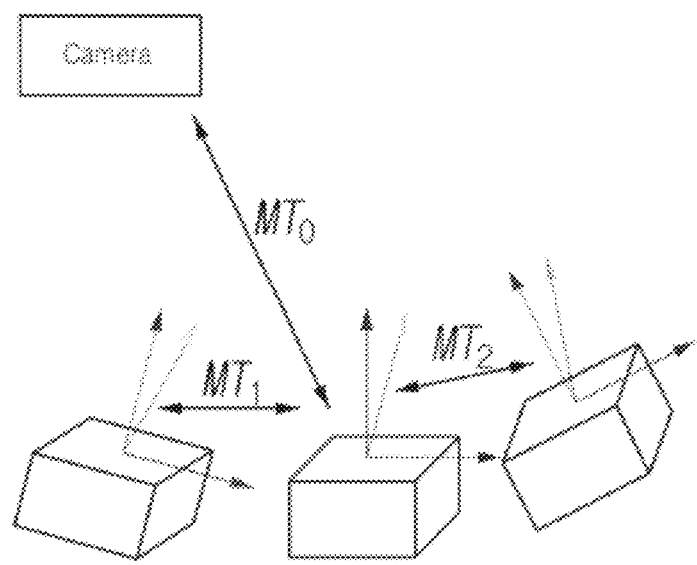

FIG. 2 is a diagram illustrating a process of extracting a relationship between physical objects. FIG. 2(*a*) shows a method of estimating a camera pose for each object, and FIG. 2(*b*) shows a method of estimating a relationship between objects. The camera pose may be represented by a 3D transformation based on a 4×4 matrix. The upper right 3×3 components of the 4×4 matrix represent a rotation value and a scaling value, and the bottom column thereof represent a translation value. Rotation, scaling and translation values for a camera pose are resulting values which are acquired when an object having a marker attached thereto is viewed by the camera. Assuming that the coordinates of the center of the camera are (0, 0, 0), a value indicating how far the object has moved away from the center of the camera, that is, a resulting value indicating that the object has moved by (x, y, z) from the center of the camera, is the translation value. The rotation value is a value indicating how much the object has rotated around the center of a camera coordinate system. The scaling value is a value indicating the scale of the marker attached to the object. If the rotation, scaling and translation values are used, how far a relevant object has moved away from a camera, how much the relevant object has rotated, and how much volume the relevant object occupies may be determined. The spatial relationship between the objects is calculated using the following Equation 1:

$$MT'_i = MT_i \times MT_0^{-1} \quad (1)$$

In the above, $MT_0$ is a camera pose value for a first tracked object, and $MT_i$ is a camera pose value for an i-th tracked object. Furthermore, $MT'_i$ is a spatial relationship value between the first tracked object and the i-th tracked object.

Figure 3A:
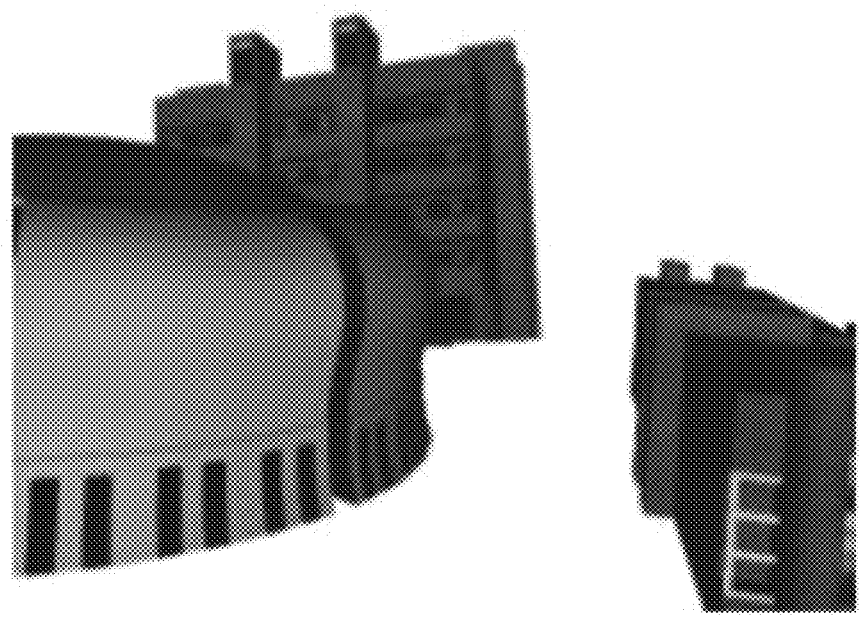
FIG. 3 is a diagram of a temporary vision image generated by a temporary image generation unit.
Figure 3B:

The image generation unit 112 performs rendering using a color value, randomly allocated to each of the visible objects by taking into consideration attributes, when generating a vision image. A temporary vision image generated by the image generation unit 112 is a synthetic vision, and is shown in FIG. 3. FIG. 3(a) shows a synthetic vision from the viewpoint of a camera. FIG. 3(b) shows a synthetic vision from the viewpoint of an agent. FIG. 3(c) shows a synthetic vision acquired by performing false coloring on each object of FIG. 3(a).

False coloring is performed according to a flat shading technique, and a color value may be randomly allocated depending on the attribute of each object. When an object rendered according to false coloring is scanned, a list of visible objects is acquired from the pixel color information. A 2-D array including vectors, including a pixel and an object identifier, is generated at the position of the object acquired using the scanning, and a 3D transformation from the agent to the object is generated. Bounding boxes are assembled for each object, and the position of the object is estimated as the center of a bonding box in relation to combined physical objects. This process allows the position of an object whose position is difficult to determine because the object is partially shaded to be accurately determined.

The object extraction unit 111 may store information, acquired by observation, in the content server as information about the extracted visible object. The list of the acquired visible objects is related to observed values. In the present embodiment, a observed value includes a tuple including $ObjID_i$, $T_i$, $P_i$, $MT_i$, $V_i$, and t as its components. $ObjID_i$ is information about an identifier, that is, an ID, allocated to an object i. When $ObjID_i$ is used, information for realistically rendering the object may be retrieved from the content server and thus the recognition of the agent can be updated. $T_i$ means the type of a physical or virtual object. $P_i$ means a characteristic suitable for the current context of an object or the attributes of an object including semantic information about the object. For example, if an object is a car, $P_i$ may determine a moved or rotated entity to be an object. $MT_i$ is information related to transformation, and means the position and orientation of an observed object. $V_i$ means the contour and angular velocity of an observed object. t means the time when an observation takes place.

Meanwhile, in a context where objects near an agent are not known, it is necessary to acquire an image including the agent. In this case, an image of an AR environment including the agent is acquired by controlling the viewing area of a camera so that the agent is included in the image.

The information storage unit 120 functions to evaluate objects, included in a vision image, based on a predetermined purpose and store information about the evaluated objects. The information storage unit 120 allocates how much objects that are recognized from the viewpoint of an agent are suitable for the purpose and work of the agent, and continuously updates memory with recognized information. For example, if the purpose of an agent is to simulate a method of controlling a real car model, a real car model is searched for and a lower-level purpose close to the real car model is generated. Thereafter, the real car model becomes a target object. The information storage unit 120 searches for an object that is most similar to the real car model by examining similarity to objects recognized based on the attribute values of the real car model. If a virtual car is recognized, the information storage unit 120 determines that the virtual car is highly related to the purpose of the agent because the virtual car has attributes that are similar to those of the real car model (i.e., the target object). If a real car model is not recognized, an agent moves to a virtual car model most similar to the target object. Meanwhile, the predetermined purpose may control not only a specific object, but also, for example, an agent and objects spaced apart from the agent by a specific interval.

The information storage unit 120 includes the suitability value calculation unit 121 and the storage unit 122.

The suitability value calculation unit 121 functions to calculate a suitability value indicating the degree to which each of the objects included in the vision image is suitable for the purpose of the agent. The suitability value calculation unit 121 calculates the degree to which each recognized object is suitable for the purpose of the agent. Accordingly, the suitability value calculation unit 121 calculates the similarity between an object (i.e., the target of the agent) and a recognized object and allocates a high suitability to a higher similarity and a low suitability to a lower similarity. The suitability value calculation unit 121 includes a comparison unit and a suitability allocation unit. The comparison unit functions to compare the similarities between the object (i.e., the target of the agent) and the objects included in the vision image. The suitability allocation unit functions to allocate a high suitability to a higher similarity using the comparison. Preferably, the suitability value calculation unit 121 controls the suitability value depending on whether the object, that is, the target of the agent, is included in the vision image.

The storage unit 122 functions to store information about the objects while taking into consideration the calculated suitability value. The storage unit 122 incorporates the degree of allocated suitability into the memory in real time. That is, in the case of an object that has never been recognized, the storage unit 122 adds the object to the memory. In contrast, in the case of an object that had previously been recognized but is not now being recognized, the storage unit 122 decreases the degree of suitability. If the degree of suitability is equal to or lower than a specific reference value, the storage unit 122 deletes the object from memory.

A lot of information is necessary to render a physical object or a virtual object in detail, in which case it is difficult to implement the rendering speed in real time. Thus, it is necessary to limit the recognition by an agent such as a human and to select the order of priority for information routing and visual processing. Below, a mechanism that is efficient at controlling the degree of attention paid to visible objects based on the visual attention mechanism of a human will be described. For the visual attention mechanism of a human, reference may be made to, for example, "Visual Attention" disclosed in "De Valois K K, editor, Seeing. 2nd ed. Pages 335-386, Academic Press, San Diego, Calif., 2000" by J. Wolfe.

Since the movement of a user, the addition of physical objects, and the deletion of physical objects may frequently occur within the viewing area of a camera, the processing speed of the mechanism should be very fast when real time is taken into consideration, and the mechanism should be robust to changes. In the present embodiment, the time used to allocate the attention is reduced by storing objects, recognized or paid attention to by the agent, in the content server using a module for performing perceptual memory management. This may help to implement a vision image in real time.

The attention mechanism of a human has the following characteristics in order to allocate limited processing resources to selected recognition. First, the attention mechanism has the ability to control recognition based on a high-level purpose, that is, a top-down control characteristic. Second, the attention mechanism has the ability to set up a perceptual purpose and continue to sustain the set-up perceptual purpose, that is, a sustained attention characteristic. Third, the attention mechanism has the ability to selectively filter recognition, that is, a selective attention characteristic. Fourth, the attention mechanism has the ability to pursue a perceptual purpose in various ways, that is, a divided attention characteristic. For the multiple perceptual purposes, reference may be made to, for example, "Computational Perceptual Attention" disclosed in "Ph.D dissertation, 2001" by M. Hewett, B. J. Kuipers, B. Hayesroth, and R. Mooney, B. Porter.

The above-described characteristics become criteria based on which the suitability value calculation unit 121 allocates the perceptual purposes of an agent in the present embodiment. The perceptual purposes of the agent are added/deleted/updated whenever a vision image from the viewpoint of the agent is generated based on the criteria.

The suitability value calculation unit 121 uses the spotlight metaphor in order to describe how attention is limited to a specific object and how attention is shifted from one object to another object. The spotlight metaphor means that attention is directed as if attention was concentratively being given to a space within a range of vision or some of the objects, like stage illumination. For the spotlight metaphor, reference may be made to "Orienting of Attention" disclosed in Quarterly Journal of Experimental Psychology, 32: 3-25, 1980 by M. Posner, "Splitting Focal Attention" disclosed in Journal of Experimental Psychology: Human Recognition and Performance, 18(3): 837-848, 1992 by U. Castiello and C. Umilta, and soon.

Spotlighting is a range within which attentional selection may be viewed. If a standard spotlight is related to the position in space, an attentional spotlight is relates to an object. Moreover, the size of a spotlight may be adjustable depending on the detailed level of a perceptual purpose. According to "Orienting of Attention" by M. Posner, two types of orientings are defined. One is a covert orienting, and the other is an overt orienting. In overt orienting, when attention is moved to a new object, an eye is also moved. In contrast, in covert orienting, the spotlight of attention is moved without there being any eye movement. In the present embodiment, the suitability value calculation unit 121 takes into consideration covert orienting.

It is necessary to allocate attention to sensed visible perceptions in order to detail an attentional spotlight from the viewpoint of an agent. Here, the attention is evaluated from a relevance whose importance has been measured in order to achieve a perceptual purpose. For example, if a high-level purpose exists in a method of controlling a toy car (i.e., a physical object), it may be considered that the perceptual purpose is to check the position of the toy car. According to the perceptual purpose, a target object is set to the toy car. When the toy car is detected, the highest relevance is allocated to the toy car. In contrast, when a virtual car (i.e., a virtual object) is detected, a higher relevance is allocated to the virtual car because it includes attributes similar to those of the target object. At the same time, a low relevance is allocated to other objects that bear no relevance to the perceptual purpose. At the same time, the ability to pursue the perceptual purpose or higher is very important. However, the performance of the agent may be limited. For example, object recognition and navigation cannot be performed at the same time, and an agent requests that the object recognition and the navigation be stopped whenever it is necessary to detect objects.

Accordingly, the relevance of a detected object is allocated to a target object related to a perceptual purpose based on the similarity. The target object is represented by a vector including the features, as shown in Equation 2:

$$T_g = \{f_1, f_2, f_3, \ldots, f_n\} \quad (2)$$

In the above equation, N means the number of target features. Each detected object is described using the same expression. If an object does not have a special target feature, $T_g$ is set to the null set.

The similarity in feature k between a detected object and a target object may be defined by Equation 3:

$$Sim(f_k, p_k) = \begin{cases} 1 & f_f \text{ matches } p_k \\ 0 & \text{otherwise} \end{cases} \quad (3)$$

Relevance $R_i$ of object $p_i$ is estimated as shown in Equation 4. The degree of attention is determined based on the estimated relevance.

$$R_i = \frac{1}{M} \sum_{g=1}^{M} Sim(T_g, p_i) \quad (4)$$

$$= \frac{1}{M} \sum_{g=1}^{M} \frac{\sum_{k=1}^{N_g} w_k \times Sim(f_k, p_k)}{N_g}$$

In the above equation, M is the number of target purposes, and $N_g$ is the number of features in a g-th target purpose. Furthermore, $w_k$ is a weight factor for a k-th feature in a target object.

In order to reduce the time it takes to allocate the attention, a perception memory component may be used. If information about an object that the attention was previously focused on is stored, a load for allocating attention to the same object may be reduced. If a value indicating the degree of attention paid to a detected object is stored in the content server, the degree of stored attention is searched for instead of actually estimating the attention, and then incorporated. In contrast, if information about a detected object is not stored in the content server, attention is calculated by means of estimation. A series of perceptions having higher attention in an attentional focus are sustained based on the retrieved or estimated attention.

There is a need for a mechanism that effectively manages perceptual memory based on search because an agent searches for an environment that may be dynamically changed. Accordingly, the attention is used as a filter for determining what observation is stored in memory and how long an observation will be stored in the memory. An observation related to an object on which the attention is focused is newly added to perceptual memory. In addition, an observation already stored in the memory is updated by taking into consideration the current observation depending on the search. An agent relies on perceptual memory in order to distinguish a subject that is observed from one that is not. For example, if an object out of the range of vision is searched for, an agent acquires information about the object from information stored in the perceptual memory. If the object was previously viewed and information thereon is stored, the agent may start from a position where the object is stored. In contrast, if the position of the object is not stored, the agent will have to perform a search over a wide range for a longtime.

In general, a human remembers experiences that the attention was focused on for a long time. For this, reference may be made to "Visual Attention" disclosed in De Valois K K, editor, Seeing. 2nd ed. Pages 335-386, Academic Press, San Diego, Calif., 2000 by J. Wolfe. In the present embodiment, the time when observation related to the degree of attention is stored may be controlled while taking into account the above point.

In order to control the time, there is proposed a layered memory approach. Table 1 shows a process of managing the perceptual memory.

TABLE 1

1. Sensing
    read observations from the attention buffer
2. detection
    For each observation p from 1
        IF p exists in the memory
            update attention(p)
        ELSE
            add attention(p) to the memory
        END-IF
    END-FOR
3. tracking
    For instance i from the memory,
        IF attention(i) > MAX_THRESHOLD
           store i to a long-term memory
        ELSE-IF attention(i) < MIN_THRESHOLD
           remove i to the memory
        ELSE
            update i with attention(i)
        END-IF
    END-FOR In the layered memory approach, an observation related to a target object is stored in memory for a long time. Furthermore, an observation having higher attention is not stored for a long time, but stored for a predetermined period. Furthermore, if specific attention is related to an object that was observed in the past and is currently not being detected, the degree of attention is decreased. The layered memory approach may be summarized as shown in Equation 5:

$$\text{attention}(t) = ae^{-k(t-t_r)} \quad (5)$$

In the above equation, a is the initial value of attention, $t_r$ is the observation time, and k is a ratio for producing a curve.

The attention level of the stored observation is continuously updated. If the attention is lower than a predefined critical value, the observation is no longer stored.

Figure 4:
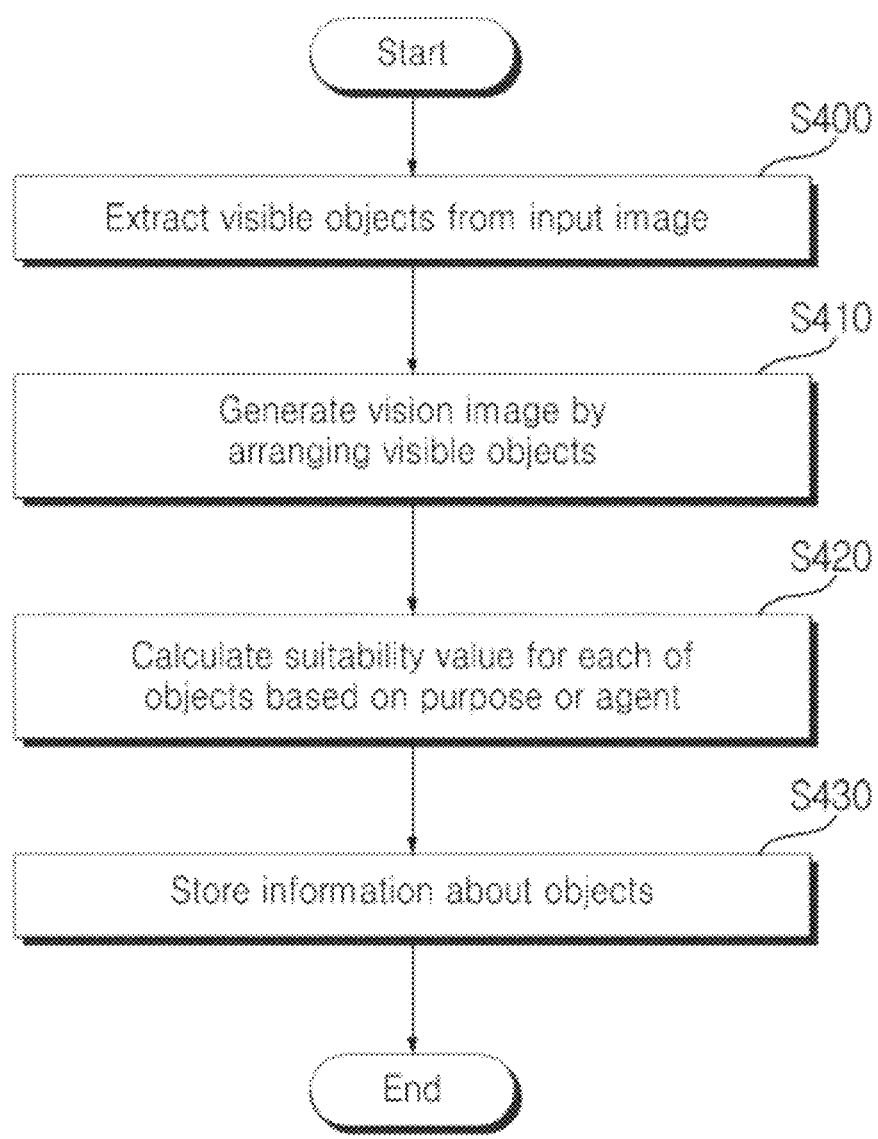
FIG. 4 is a flowchart illustrating a method of storing vision image information from the viewpoint of an agent according to a preferred embodiment of the present invention.

Next, a method of storing vision image information in the system for storing vision image information will be described. FIG. 4 is a flowchart illustrating a method of storing vision image information according to a preferred embodiment of the present invention. The following description is given with reference to FIG. 4.

First, the vision image generation unit 110 generates a vision image from the viewpoint of a predetermined agent by extracting visible objects in an AR environment based on the agent. This will be described in more detail below. The object extraction unit 111 extracts the visible objects from the viewpoint of the agent from an input image of an AR environment (S400). Thereafter, the image generation unit 112 generates the vision image by arranging the extracted visible objects based on the agent (S410).

After the vision image has been generated, the information storage unit 120 evaluates the objects, included in the vision image, based on a predetermined purpose and stores information about the evaluated objects. This will be described in more detail below. The suitability value calculation unit 121 calculates a suitability value indicating the degree to which each of the objects included in the generated vision image is suitable for the purpose of the agent (S420). Thereafter, the storage unit 122 stores information about the objects by taking into consideration the calculated suitability values (S430).

Meanwhile, the embodiments of the present invention may be written in the form of a program executable by a computer and may be implemented using a computer-readable recording medium in a general-purpose digital computer for operating the program. The computer-readable recording medium includes storage media, such as magnetic storage media (e.g., ROM, a floppy disk, a hard disk, and a magnetic tape), optical reading media (e.g., CD-ROM, DVD, and an optical data storage device), and carrier waves (e.g., transmission over the Internet).

The above description is merely an illustrative description of the technical spirit of present invention, and those skilled in the art may change and modify the description in various ways without departing from the essential characteristics of the present invention. Accordingly, the embodiments and drawings disclosed in the present invention are not intended to limit the technical spirit of the present invention, but are illustrative. The scope of the technical spirit of the present invention is not limited by the embodiments and drawings, and the scope of the present invention should be interpreted based on the following appended claims. Accordingly, all technical spirits falling within an equivalent range should be construed to be included in the scope of the present invention.

INDUSTRIAL APPLICABILITY

The present invention is directed towards a context awareness method and system based on the synthetic vision of an AR agent, and is related to a technology in which an agent autonomously recognizes objects. The present invention may be applied to apparatuses, computer games and virtual training systems which depict a virtual environment from the viewpoint of a user. The present invention may also be applied to developing an interactive u-book writing toolkit, an interactive digilog book storage technology, etc.

The invention claimed is:
1. A system for storing vision image information, comprising:
a vision image generation unit for extracting visible objects from an Augmented Reality (AR) environment based on a predetermined agent and then generating a vision image from a viewpoint of the agent; and an information storage unit for storing information about objects evaluated based on a predetermined purpose and included in the generated vision image, wherein the vision image generation unit comprises:

an object extraction unit for extracting the visible objects from the viewpoint of the agent from an input image of the AR environment; and an image generation unit for arranging the extracted visible objects based on the agent and then generating the vision image.

2. The system according to claim 1, wherein the information storage unit comprises:

a suitability value calculation unit for calculating a suitability value indicating a degree to which each of the objects included in the generated vision image is suitable for the purpose; and a storage unit for storing the information about the objects while taking into consideration the calculated suitability values.

3. The system according to claim 2, wherein the suitability value calculation unit comprises:

a comparison unit for comparing similarities between an object used by the agent as a target and the objects included in the generated vision image; and a suitability allocation unit for allocating a higher suitability to a higher similarity based on the comparison.

4. The system according to claim 2, wherein the suitability value calculation unit controls the suitability value depending on whether the object used by the agent as the target is included in the generated vision image.

5. The system according to claim 1, wherein the object extraction unit extracts the visible objects by comparing feature points between the input image and a previously stored image.

6. The system according to claim 5, wherein the object extraction unit comprises:

a feature point extraction unit for extracting the feature points from the input image;

an orientation estimation unit for estimating an orientation of the feature points from a patch image that incorporates the extracted feature points;

a patch image rotation unit for rotating the patch image in the estimated orientation;

a descriptor generation unit for generating first descriptors for the respective extracted feature points based on the rotation;

a comparison unit for performing comparison in order to check whether there is one of the generated first descriptors which matches a second descriptor acquired from the previously stored image;

a pose estimation unit for estimating a pose of a photographing apparatus using the first descriptor which matches the second descriptor; and a visible object extraction unit for extracting the visible objects by performing object recognition and the object tracking based on the estimated pose.

7. The system according to claim 1, wherein the image generation unit comprises:

a spatial relationship setup unit for setting up a spatial relationship between the visible objects using tracking information about objects, placed in the AR environment, when arranging the extracted visible objects; and an object arrangement unit for arranging the extracted visible objects while taking into consideration the set-up spatial relationship.

8. The system according to claim 7, wherein each of the objects placed in the AR environment includes a marker used for recognition or tracking.

9. The system according to claim 7, wherein the spatial relationship setup unit uses a translation value indicative of how far the object has moved from a photographing apparatus for photographing the AR environment, a rotation value indicative of by how much the object has rotated around a center coordinate system of the photographing apparatus, and a scale of a marker attached to the object when setting up the spatial relationship.

10. The system according to claim 1, wherein the image generation unit performs rendering using a color value, randomly allocated to each of the visible objects by taking into consideration attributes, when generating the vision image.

11. The system according to claim 1, wherein the object extraction unit extracts the visible objects whenever there is a change in an image of an area in front of the agent or in a viewing area of a photographing apparatus for photographing the AR environment.

12. A method of storing vision image information, comprising the steps of:

(a) extracting a visible objects from an Augmented Reality (AR) environment based on a predetermined agent and then generating a vision image from a viewpoint of the agent; and (b) storing information about objects evaluated based on a predetermined purpose and included in the generated vision image, wherein the step (a) extracts the visible objects from an input image of the AR environment from the viewpoint of the agent, and generates the vision image by arranging the extracted visible objects based on the agent.

13. The method according to claim 12, wherein the step (b) comprises the steps of:(ba) calculating a suitability value indicating a degree to which each of the objects included in the generated vision image is suitable for the purpose; and (bb) storing information about the objects while taking into consideration the calculated suitability values.

14. The method according to claim 13, wherein the step (ba) comprises the steps of:

(baa) comparing similarities between an object used by the agent as a target and the objects included in the generated vision image; and (bab) allocating a higher suitability to a higher similarity based on the comparison.

15. A non-transitory computer-readable recording medium storing a program for implementing a method according to claim 14.

16. A non-transitory computer-readable recording medium storing a program for implementing a method according to claim 13.

17. A non-transitory computer-readable recording medium storing a program for implementing a method according to claim 12.

* * * * *